US011829384B1

(12) United States Patent
Lu et al.

(10) Patent No.: US 11,829,384 B1
(45) Date of Patent: Nov. 28, 2023

(54) AMORTIZING REPLICATION LOG UPDATES FOR TRANSACTIONS

(71) Applicant: Amazon Technologies, Inc., Seattle, WA (US)

(72) Inventors: Ming Judy Lu, Saratoga, CA (US); Gopi Krishna Attaluri, Cupertino, CA (US); Alexandre Olegovich Verbitski, Woodinville, WA (US); Kamal Kant Gupta, Belmont, CA (US); Saileshwar Krishnamurthy, Palo Alto, CA (US); Xiaofeng Bao, Fremont, CA (US); Zhonghua Feng, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 370 days.

(21) Appl. No.: 16/450,929

(22) Filed: Jun. 24, 2019

(51) Int. Cl.
*G06F 16/27* (2019.01)
*G06F 9/46* (2006.01)
*G06F 16/23* (2019.01)

(52) U.S. Cl.
CPC .......... *G06F 16/275* (2019.01); *G06F 9/466* (2013.01); *G06F 16/2358* (2019.01)

(58) Field of Classification Search
CPC ............ G06F 16/27; G06F 16/23; G06F 9/04
See application file for complete search history.

(56) References Cited

U.S. PATENT DOCUMENTS

| | | | |
|---|---|---|---|
| 6,493,726 B1 * | 12/2002 | Ganesh | G06F 16/2343 |
| 6,631,478 B1 * | 10/2003 | Wang | G06F 11/1471 |
| | | | 714/E11.13 |
| 7,243,088 B2 * | 7/2007 | Verma | G06F 16/2329 |
| | | | 707/696 |
| 7,472,422 B1 * | 12/2008 | Agbabian | H04L 41/06 |
| | | | 726/25 |
| 7,680,181 B1 * | 3/2010 | Lin | H04N 21/6379 |
| | | | 375/240.26 |
| 7,702,698 B1 | 4/2010 | Chakravarthy | |
| 8,510,270 B2 | 8/2013 | Pareek et al. | |
| 8,838,539 B1 * | 9/2014 | Ashcraft | H04L 67/01 |
| | | | 707/637 |
| 9,959,074 B1 * | 5/2018 | Shain | G06F 15/17331 |
| 10,884,796 B2 * | 1/2021 | Scheuer | G06F 16/27 |
| 2006/0271748 A1 * | 11/2006 | Jain | G11C 7/1021 |
| | | | 711/154 |
| 2011/0119538 A1 * | 5/2011 | Ipek | G06F 11/1666 |
| | | | 714/763 |
| 2015/0205850 A1 * | 7/2015 | Lu | G06F 16/2358 |
| | | | 707/615 |
| 2015/0347547 A1 | 12/2015 | Kasheff et al. | |
| 2020/0125582 A1 * | 4/2020 | O'Shaughnessy | G06F 16/245 |

* cited by examiner

*Primary Examiner* — Hares Jami
*Assistant Examiner* — Vy H Ho
(74) *Attorney, Agent, or Firm* — S. Scott Foster; Kowert, Hood, Munyon, Rankin & Goetzel, P.C.

(57) ABSTRACT

Updates for transactions to a replication log for a database may be amortized. As updates are received as part of an active transaction, replication log records may be generated. When the size of replication log records exceeds a transaction size threshold, the replication log records may be stored in a remote data store instead of a local data store. When a request to commit the active transaction is received, an replication log for the database may be updated to include the replication log records from a transaction data object in the remote data store.

20 Claims, 8 Drawing Sheets

AMORTIZING REPLICATION LOG UPDATES FOR TRANSACTIONS

BACKGROUND

Database replication techniques offer users the opportunity to replicate changes made to one database across different locations, systems, services or devices, providing, among other features wide availability and accessibility of data stored in a database. Database replication techniques, however, are not implemented without costs. In order to ensure consistency with replicas of the database features, such as replication logging may be implemented in addition to the features that support the source database workload to perform, among many other operations, transactions or other updates to the source database. Therefore, techniques that can reduce the cost of database replication techniques while providing similar consistency assurances are highly desirable.

Figure 1:
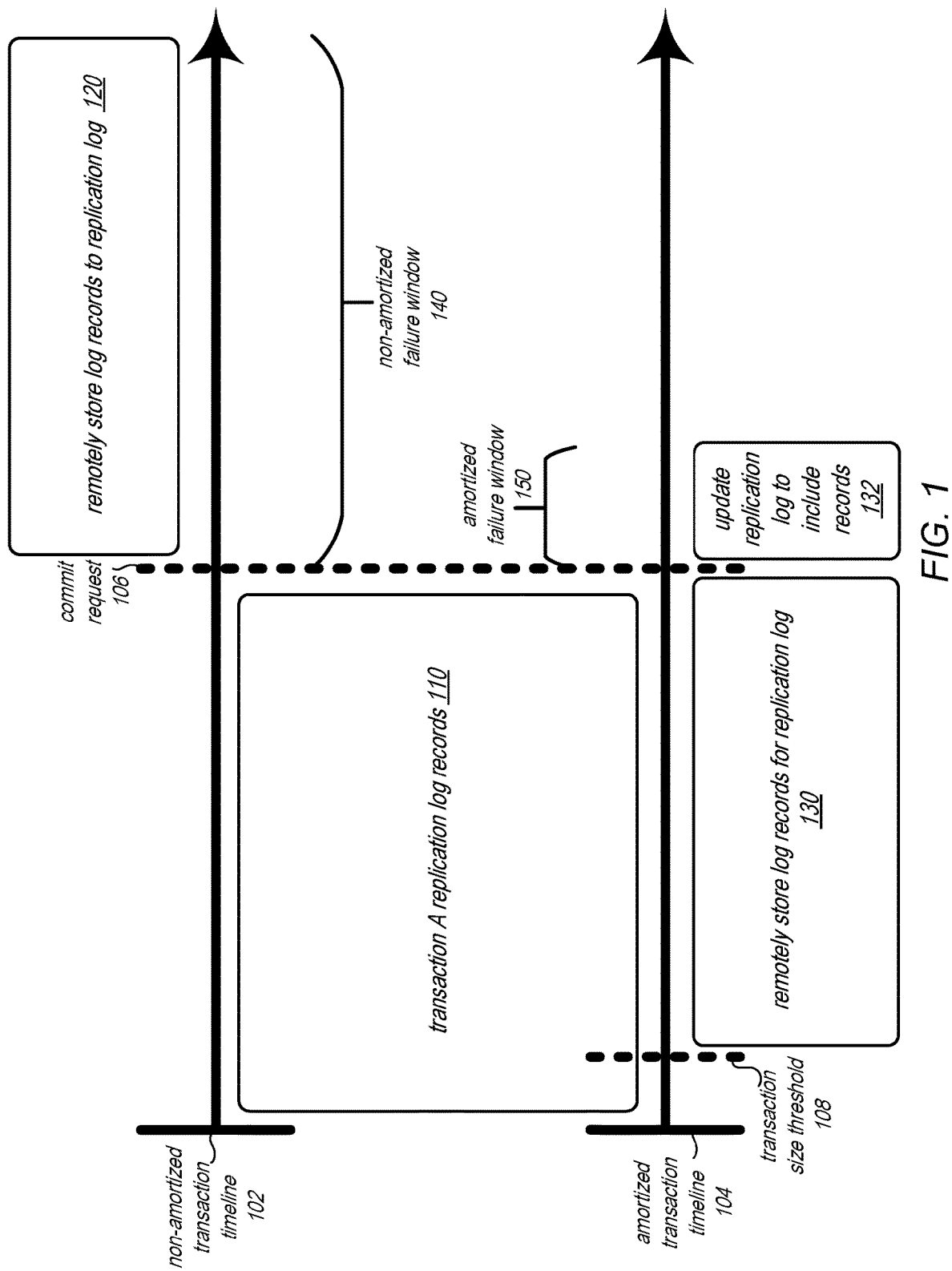
FIG. 1 is a logical block diagram illustrating amortizing replication log updates for transactions, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various techniques for amortizing replication log updates for transactions are described. Replication logs for databases, such as MySQL's Binlog feature, may support various types of applications that utilize additional copies of a database, such as additional read copies, Change Data Capture, and database migration. When replication logging is enabled, a database may copy all transaction data into the replication log on commit of a transaction, in various embodiments, which can take a long time if the transaction has large amount of data. In some embodiments, such as network-based (e.g., cloud-based) applications, where the data storage destination of a replication log is not local, the copy time may become extended even further. If the database were to fail (e.g., application crash, power outage, etc.) when the copying of transaction data to the replication occurs, the recovery time can be lengthy since the database may need to rollback changes in both the database itself (e.g., using undo logs of the transaction) and restore the replication log to a consistent state. This downtime can significantly impact the performance of client applications of a database, because recovery operations may cause the database to be offline or otherwise unavailable.

Techniques for amortizing replication log updates for transactions may significantly reduce the risk of long recovery operations, such as in scenarios where a very large transaction would be vulnerable to failure during the updating of replication log to commit the transaction. Instead, amortizing replication log updates for transactions can minimize the amount of work remaining to commit a transaction. In this way, the window of time during which database failures can cause significant down time are reduced significantly.

For example, without the implementation of amortizing replication log updates for transactions, downtime to recover a very large transaction is sometimes several hours or days, effectively shutting down client applications of the database during that recovery. With amortizing replication log updates for transactions, that downtime can be reduced to minutes (or less), in some scenarios. Additionally, a database can handle much larger transactions because utilization of local storage capacity to store replication log records can be minimized. The database can also experience improvements in throughput for very large transactions, since the commit time can be significantly reduced. Moreover, the reduction in commit time also provides other transactions and workloads with more resources to complete, such as by not blocking smaller transactions on commit (e.g., by reducing the time holding lock for serializing replication log writes).

FIG. 1 is a logical block diagram illustrating amortizing replication log updates for transactions, according to some embodiments. Two different timelines are illustrated. Non-amortized transaction timeline 102 may illustrate, in various embodiments, a replication log technique that does not amortize the transmission of replication log records for inclusion in a replication log. Consider transaction A. Transaction A may be an active transaction for which replication log records 110 are being generated as updates to the database as part of the transaction are received. When commit request 106 for transaction A is received, log records for transaction A may be stored 120 to a data store for the replication log, which may be a non-local or remote data store (e.g., over a network connection, such as the transmission of replication log records discussed below with regard to FIGS. 2-4). The period of time for transmitting and updating the replication log to include the transaction after commit may be indicated by non-amortized failure window 140 (which may represent a time during which a failure could cause a significant downtime to recover the database).

Amortized transaction timeline 104 may illustrate a replication log technique that amortizes transmission of replication log records for inclusion in the replication log. In various embodiments, replication log records 110 may be stored locally (e.g., in cache and/or local persistent storage in some embodiments as discussed below in FIGS. 2-7) until a transaction size threshold 108 is reached. After exceeding the transaction size threshold 108 (e.g., according to a size of storage space, such as 512 MB, or number of records), replication log records may be stored to a remote data store 130 for inclusion in the replication log. When commit request 106 is received, the replication log may be updated to include the log records, as indicated at 132. However, the amortized failure window 150 is significantly smaller than the non-amortized failure window 140. Moreover, additional optimizations may be implemented to update the replication log 132, such as updating the replication log without additional data copying from a transaction data object that stores the data log, updating without duplicating structural and accuracy features for the replication log, such as the calculation of record offsets and checksums, and inserting the log records into a location in the replication log consistent with the order applied by the replication log, such as an order where transactions are stored in the order in which they committed to the database, in some embodiments.

In some cases, non-amortized replication techniques may be more or equally performant. For example, for transactions less than the transaction size threshold, the update replication log operations may take more time and/or other processing costs than performing at one time after commit. Thus, for some transactions, as discussed below with regard to FIG. 6, non-amortized replication log techniques may be performed concurrently with amortized replication log techniques.

Please note, FIG. 1 is provided as a logical illustration and is not intended to be limiting as to the physical arrangement, size, or number of components, modules, or devices to implement such features.

The specification first describes an example of a provider network that may implement a database service and storage service, according to various embodiments. Included in the description of the example network-based services to amortize replication log updates for transactions. The specification then describes a flowchart of various embodiments of methods for amortizing replication log updates for transactions. Next, the specification describes an example system that may implement the disclosed techniques. Various examples are provided throughout the specification.

Figure 2:
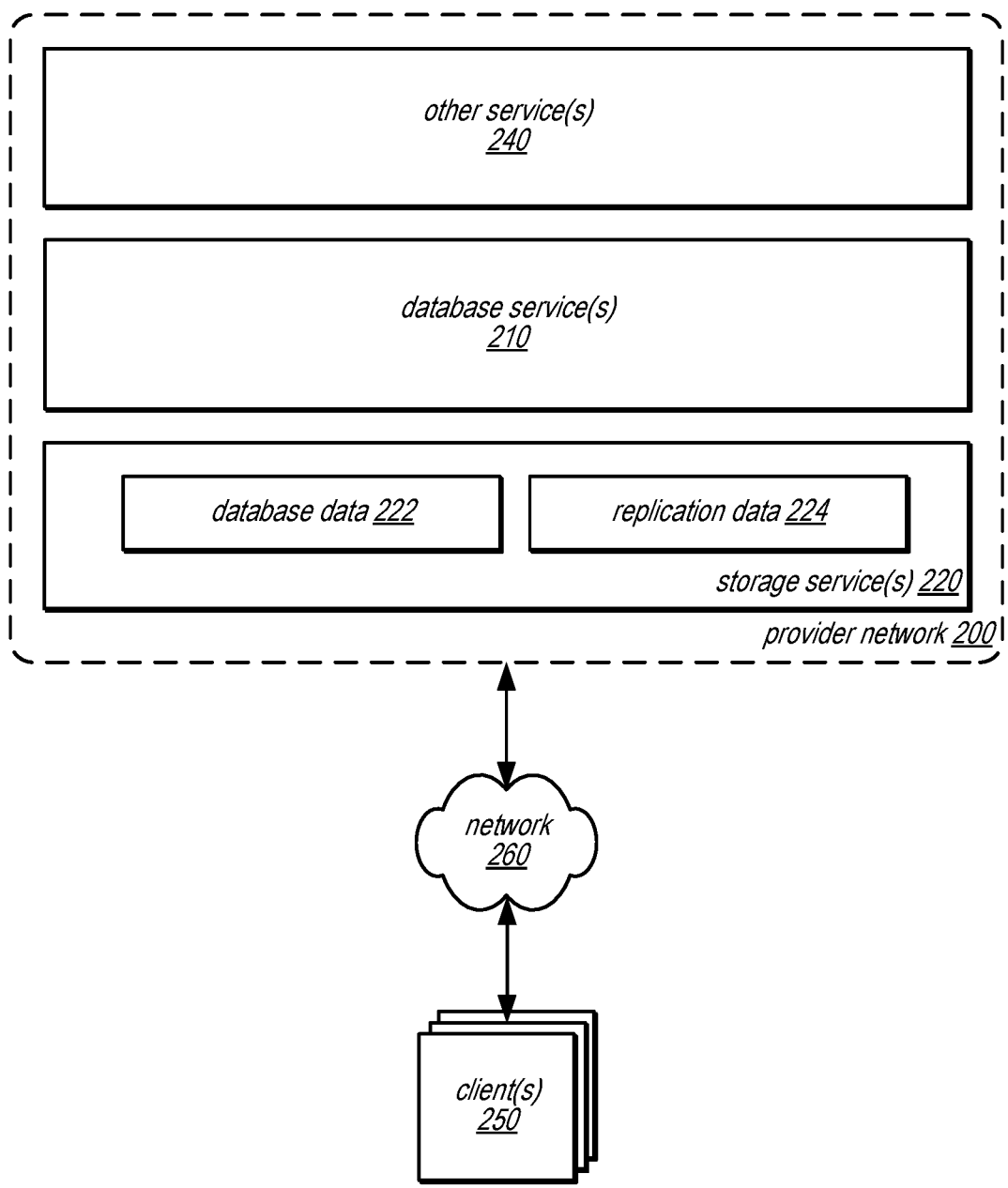
FIG. 2 is a logical block diagram illustrating a provider network that implements a database service and separate storage service that implements amortizing replication log updates for transactions, according to some embodiments.

FIG. 2 is a logical block diagram illustrating a provider network that implements a database service and separate storage service that implements amortizing replication log updates for transactions, according to some embodiments. Provider network 200 may be set up by an entity such as a company or a public sector organization to provide one or more services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200.

In some embodiments, provider network 200 may implement various network-based services, including database service(s) 210, a storage service(s) 220, and/or one or more other virtual computing services 240 (which may include various other types of storage, processing, analysis, communication, event handling, visualization, and security services). Database service(s) 210 may implement various types of database systems and formats (e.g., relational, non-relational, graph, document, time series, etc.) and the respective types of query engines to perform queries to those databases. Storage service(s) 220 may include many different types of data stores, including a log-structured storage service or other storage services as discussed below with regard to FIGS. 3 and 4, in some embodiments and may store both database data 222 and replication data 224.

Clients 250 may access these various services offered by provider network 200 via network 260. Likewise network-based services may themselves communicate and/or make use of one another to provide different services. For example, storage service 220 may store data 222 for databases managed by database service 210, in some embodiments. It is noted that where one or more instances of a given component may exist, reference to that component herein may be made in either the singular or the plural. However, usage of either form is not intended to preclude the other In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to execute a transaction or query with respect to a database, a request to manage a database, such as a request to enable or disable performing queries across different types of query engines, etc.). For example, a given client 250 may include a suitable version of a web browser, or may include a plug-in module or other type of code module that can execute as an extension to or within an execution environment provided by a web browser. Alternatively, a client 250 (e.g., a database service client) may encompass an application, a web server, a media application, an office application or any other application that may make use of provider network 200 to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with network-based services platform 200. In some embodiments, client 250 may generate network-based services requests according to a Representational State Transfer (REST)-style network-based services architecture, a document- or message-based network-based services architecture, or another suitable network-based services architecture. In some embodiments, a client of database service(s) 210 may be implemented within provider network 200 (e.g., on another service 240, such as virtual computing service).

In some embodiments, a client 250 (e.g., a database service client) may provide access to a database hosted in database service 210 to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders, in one embodiment. In such an embodiment, applications may not need to be modified to make use of the storage system service model. Instead, the details of interfacing to provider network 200 may be coordinated by client 250 and the operating system or file system on behalf of applications executing within the operating system environment.

Client(s) 250 may convey network-based services requests (e.g., a request to query a database or perform a transaction at a database) to and receive responses from services implemented as part of provider network 200 via network 260, in some embodiments. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Services within provider network 200 (or provider network 200 itself) may implement one or more service endpoints to receive and process network-based services requests, such as requests to access data pages (or records thereof), in various embodiments. For example, provider network 200 services may include hardware and/or software to implement a particular endpoint, such that an HTTP-based network-based services request directed to that endpoint is properly received and processed, in one embodiment. In one embodiment, provider network 200 services may be implemented as a server system to receive network-based services requests from clients 250 and to forward them to components of a system within database service 210, storage service 220 and/or another virtual computing service 240 for processing.

In some embodiments, provider network 200 (or the services of provider network 200 individually) may implement various user management features. For example, provider network 200 may coordinate the metering and accounting of user usage of network-based services, including storage resources, such as by tracking the identities of requesting clients 250, the number and/or frequency of client requests, the size of data tables (or records thereof) stored or retrieved on behalf of user, overall storage bandwidth used by users or clients 250, class of storage requested by users or clients 250, or any other measurable user or client usage parameter, in one embodiment. In one embodiment, provider network 200 may also implement financial accounting and billing systems, or may maintain a database of usage data that may be queried and processed by external systems for reporting and billing of client usage activity. In some embodiments, provider network 200 may be to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, provider network 200 may also implement user authentication and access control procedures. For example, for a given network-based services request to access a particular database, provider network 200 may implement administrative or request processing components that may ascertain whether the client 250 associated with the request is authorized to access the particular database. Provider network 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, provider network 200 may reject the corresponding network-based services request, for example by returning a response to the requesting client 250 indicating an error condition, in one embodiment. Various access control policies may be stored as records or lists of access control information by database service 210, storage service 220 and/or other virtual computing services 230, in one embodiment.

Figure 3:
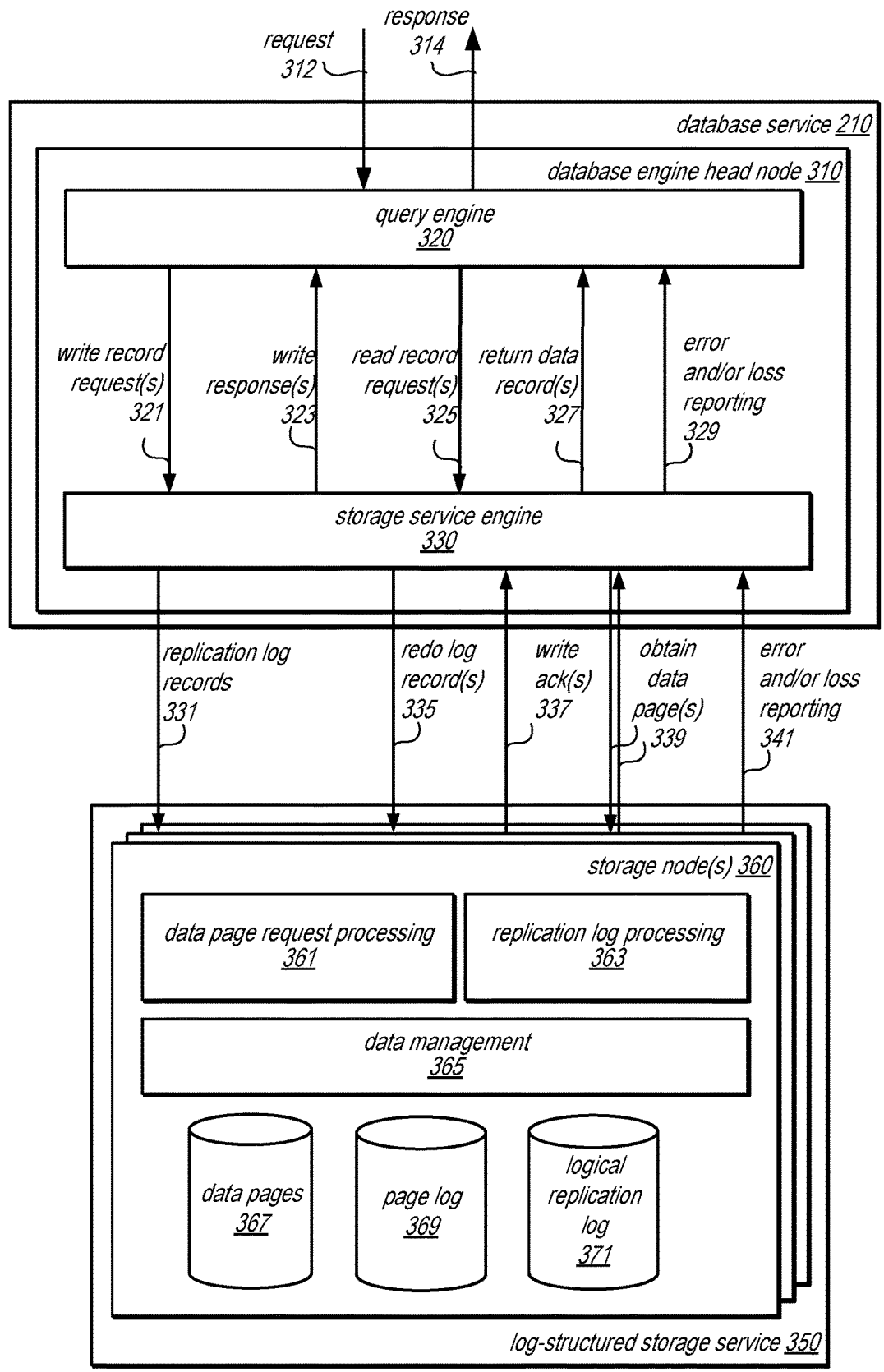
FIG. 3 is a logical block diagram illustrating various components of a database service and separate storage service, according to some embodiments.

FIG. 3 is a logical block diagram illustrating various components of a database service and separate storage service, according to some embodiments. Database service 210 may implement one or more different types of database systems with respective types of query engines for accessing database data as part of the database. In the example database system implemented as part of database service 210, a database engine head node 310 may be implemented for each of several databases and a log-structured storage service 350 (which may or may not be visible to the clients of the database system). Clients of a database may access a database head node 310 (which may be implemented in or representative of a database instance) via network utilizing various database access protocols (e.g., Java Database Connectivity (JDBC) or Open Database Connectivity (ODBC)). However, log-structured storage service 350, which may be employed by the database system to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, log-structured storage service 350 may perform various storage, access, change logging, recovery, log record manipulation, and/or space management operations in a manner that is invisible to clients of a database engine head node 310.

As previously noted, a database instance may include a single database engine head node 310 that implements a query engine 320 that receives requests, like request 312, which may include queries or other requests such as updates, deletions, etc., from various client programs (e.g., applications) and/or subscribers (users), then parses them, optimizes them, and develops a plan to carry out the associated database operation(s). Query engine 320 may return a response 314 to the request (e.g., results to a query) to a database client, which may include write acknowledgements, requested data pages (or portions thereof), error messages, and or other responses, as appropriate. As illustrated in this example, database engine head node 310 may also include a storage service engine 330 (or client-side driver), which may route read requests and/or redo log records to various storage nodes within log-structured storage service 350, receive write acknowledgements from log-structured storage service 350, receive requested data pages from log-structured storage service 350, and/or return data pages, error messages, or other responses to query engine 320 (which may, in turn, return them to a database client).

In this example, query engine 320 or another database system management component implemented at database engine head node 310 (not illustrated) may manage a data page cache, in which data pages that were recently accessed may be temporarily held. Query engine 320 may be responsible for providing transactionality and consistency in the database instance of which database engine head node 310 is a component. For example, this component may be responsible for ensuring the Atomicity, Consistency, and Isolation properties of the database instance and the transactions that are directed that the database instance, such as determining a consistent view of the database applicable for a query, applying undo log records to generate prior versions of tuples of a database. Query engine 320 may manage an undo log to track the status of various transactions and roll back any locally cached results of transactions that do not commit.

FIG. 3 illustrates various interactions to perform various requests, like request 312. For example, a request 312 that includes a request to write to a page may be parsed and optimized to generate one or more write record requests 321, which may be sent to storage service engine 330 for subsequent routing to log-structured storage service 350. In this example, storage service engine 330 may generate one or more redo log records 335 corresponding to each write record request 321, and may send them to specific ones of the storage nodes 360 of log-structured storage service 350. Log-structured storage service 350 may return a corresponding write acknowledgement 337 for each redo log record 335 (or batch of redo log records) to database engine head node 310 (specifically to storage service engine 330). Storage service engine 330 may pass these write acknowledgements to query engine 320 (as write responses 323), which may then send corresponding responses (e.g., write acknowledgements) to one or more clients as a response 314.

In another example, a request that is a query may cause data pages to be read and returned to query engine 320 for evaluation and processing or a request to perform query processing at log-structured storage service 350 may be performed. For example, a query could cause one or more read record requests 325, which may be sent to storage service engine 330 for subsequent routing to log-structured storage service 350. In this example, storage service engine 330 may send these requests to specific ones of the storage nodes 360 of log-structured storage service 350, and log-structured storage service 350 may return the requested data pages 339 to database engine head node 310 (specifically to storage service engine 330). Storage service engine 330 may send the returned data pages to query engine 320 as return data records 327, and query engine may then evaluate the content of the data pages in order to determine or generate a result of a query sent as a response 314. As discussed below with regard to FIG. 4, some requests to store replication log records 331 may be performed as part of performing replication log techniques (e.g., to amortize the transmission of replication records to a replication log).

In some embodiments, various error and/or data loss messages 341 may be sent from log-structured storage service 350 to database engine head node 310 (specifically to storage service engine 330). These messages may be passed from storage service engine 330 to query engine 320 as error and/or loss reporting messages 329, and then to one or more clients as a response 314.

In some embodiments, the APIs 331-341 of log-structured storage service 350 and the APIs 321-329 of storage service engine 330 may expose the functionality of the log-structured storage service 350 to database engine head node 310 as if database engine head node 310 were a client of log-structured storage service 350. For example, database engine head node 310 (through storage service engine 330) may write redo log records or request data pages through these APIs to perform (or facilitate the performance of) various operations of the database system implemented by the combination of database engine head node 310 and log-structured storage service 350 (e.g., storage, access, change logging, recovery, and/or space management operations).

Note that in various embodiments, the API calls and responses between database engine head node 310 and log-structured storage service 350 (e.g., APIs 321-329) and/or the API calls and responses between storage service engine 330 and query engine 320 (e.g., APIs 331-341) in FIG. 3 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine head node 310 and/or log-structured storage service 350.

In some embodiments, database data for a database of database service 210 may be organized in various logical volumes, segments, and pages for storage on one or more storage nodes 360 of log-structured storage service 350. For example, in some embodiments, each database may be represented by a logical volume, and each logical volume may be segmented over a collection of storage nodes 360. Each segment, which lives on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

As discussed above, log-structured storage service 350 may perform some database system responsibilities, such as the updating of data pages for a database, and in some instances perform some query processing on data. As illustrated in FIG. 3, storage node(s) 360 may implement data page request processing 361, replication log processing 363, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request. Replication log processing 363 may handle requests to store replication logs to transaction objects and update replication logs stored in or associated with logical replication log 371.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

Figure 4:
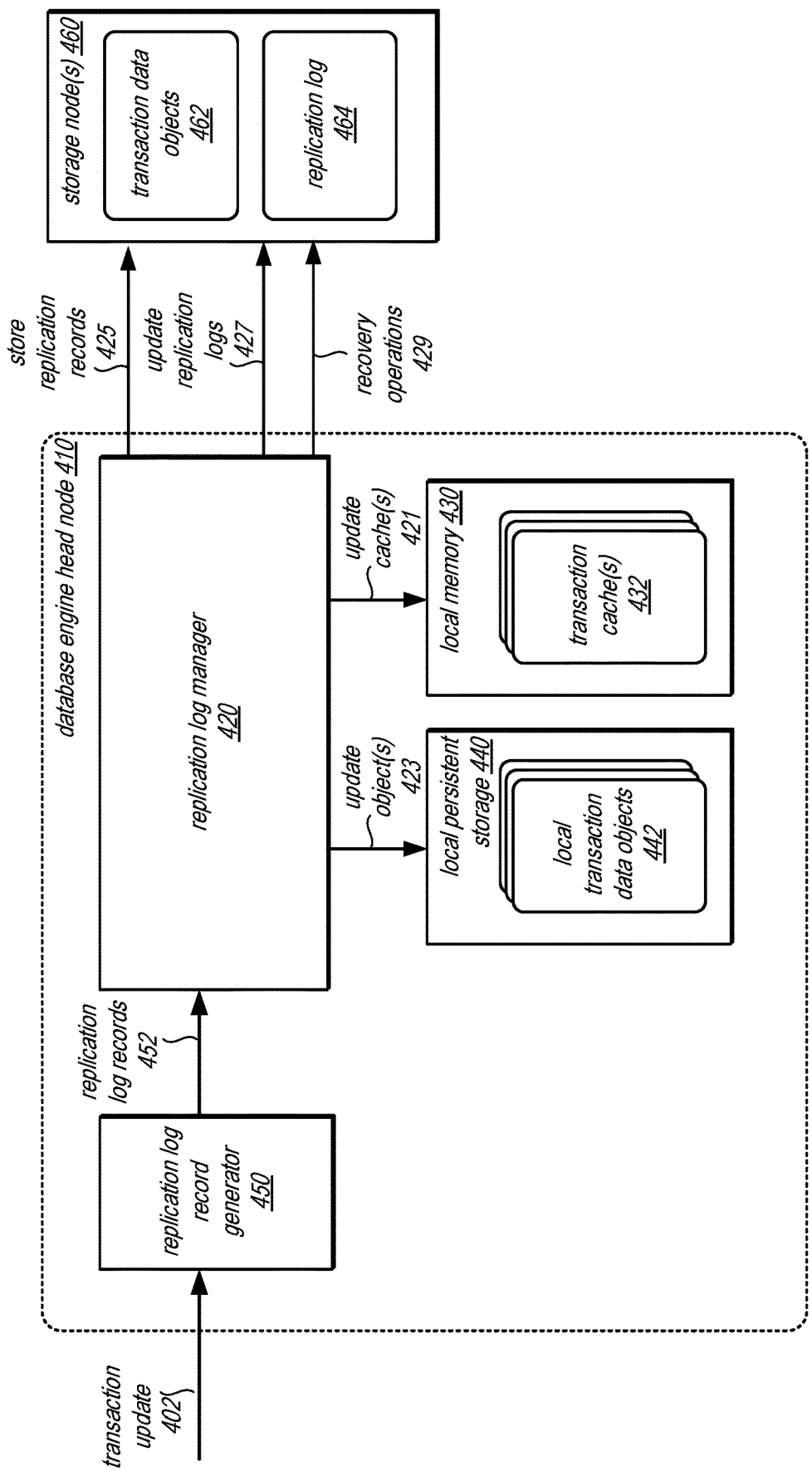
FIG. 4 is a logical block diagram illustrating amortization of replication logs to remote storage, according to some embodiments.

FIG. 4 is a logical block diagram illustrating amortization of replication logs to remote storage, according to some embodiments. Database engine head node 410 may implement replication log manager 420 which may perform various techniques to implement amortized and non-amortized replication logging techniques. Transaction updates 402 may be received at replication log record generator 450 which may generate a log record that describes or indicates the update to the database as well as the associated transaction. In some embodiments, the replication log may be a logical replication log (e.g., describing the changes so that the changes can be performed). In other embodiments, the replication log may be a physical replication log (e.g., including a new record, field, item, or other value that stores the value after the update is applied). Replication log record generator 450 may support different types or formats of replication log records, which may be selectable in response to a request, in some embodiments.

Replication log records 452 may be provided to replication log manager 420 which may determine where to store and when to move replication log records 452, for instance according to the techniques discussed below with regard to FIGS. 5 and 6. Replication log manager 420 may update 421 local memory 430 to store replication log records in the corresponding transaction cache 432. Replication log manager 420 may update 423 local persistent storage 440 to store log records in local transaction data objects 442, in some embodiments, which are not being amortized (or not yet being amortized). Replication log manager 420 may store replication log records 425 in transaction data objects 462 for amortized replication techniques and directly in replication log 464 when a commit is received for a non-amortized transaction. Note that in some embodiments, transaction data objects 462 and 442 may be append-only data objects.

Replication log manager 420 may perform update operations 427 to include transactions in replication log 464 in response to a commit. In some embodiments, updates to replication log 464 may be synchronized according to various synchronization features, such as latches. For example, replication log manager 420 may update a replication log index to indicate the inclusion of additional replication log records, rename a transaction data object 462 for inclusion in replication log 464, update pointers (e.g., from other log records in replication log 464 and/or a transaction data object 462) to point to the replication records of the transaction data object 462 in order to include the replication log records of the transaction data object 462 without rewriting the replication log records into the replication log. Replication log manager 420 may also perform recovery operations 429 to replication log in the event of a failure that causes a roll-back of transactions to make replication log 464 consistent with the database, in some embodiments, as discussed above with regard to FIG. 1. For instance, replication log manager 420 may determine whether to apply undo records to rollback a transaction that did not commit in both the replication log and at the database.

Figure 5:
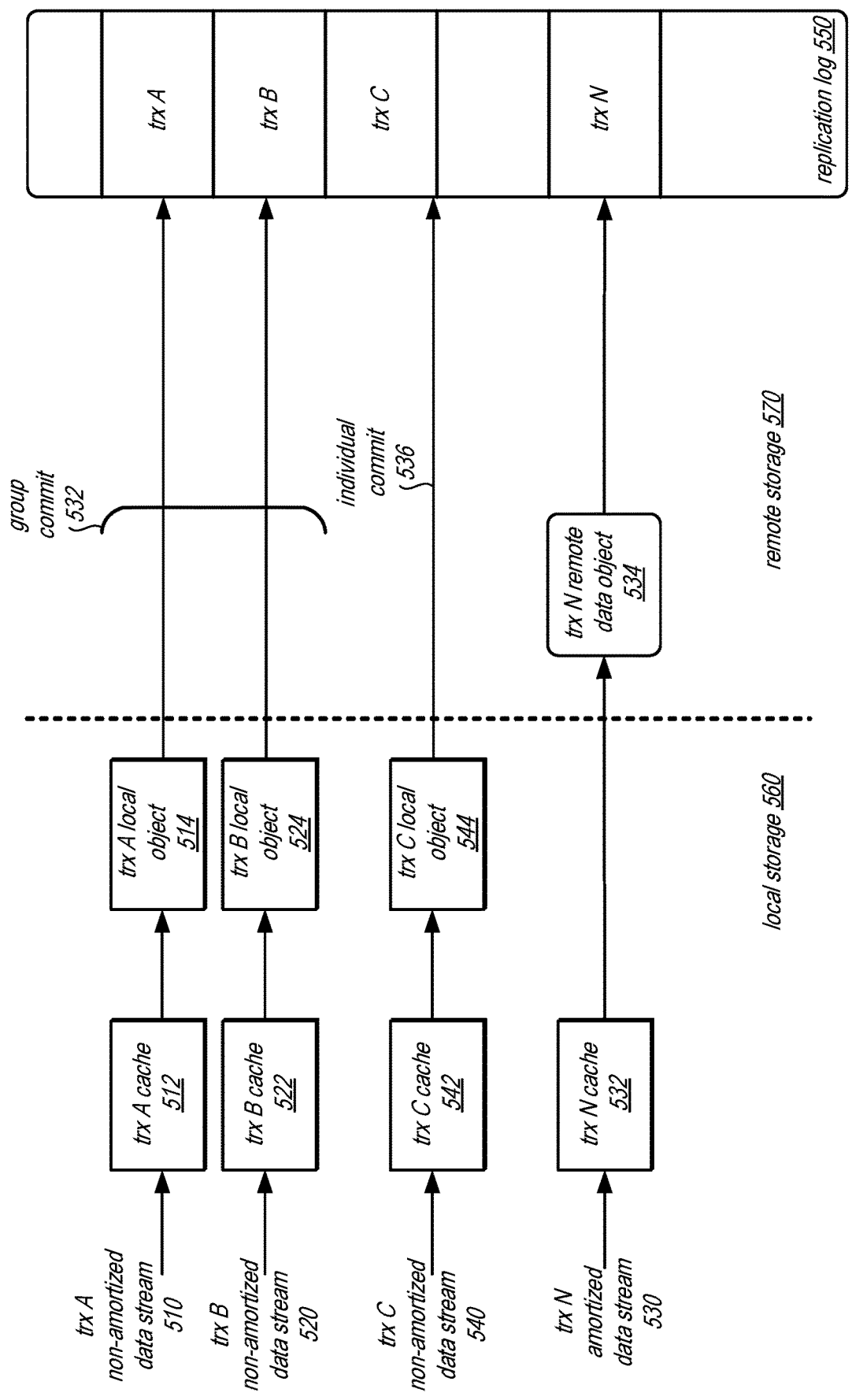
FIG. 5 is a logical block diagram illustrating a data flow for both amortizing and non-amortizing replication log records for transactions, according to some embodiments.
Figure 6:
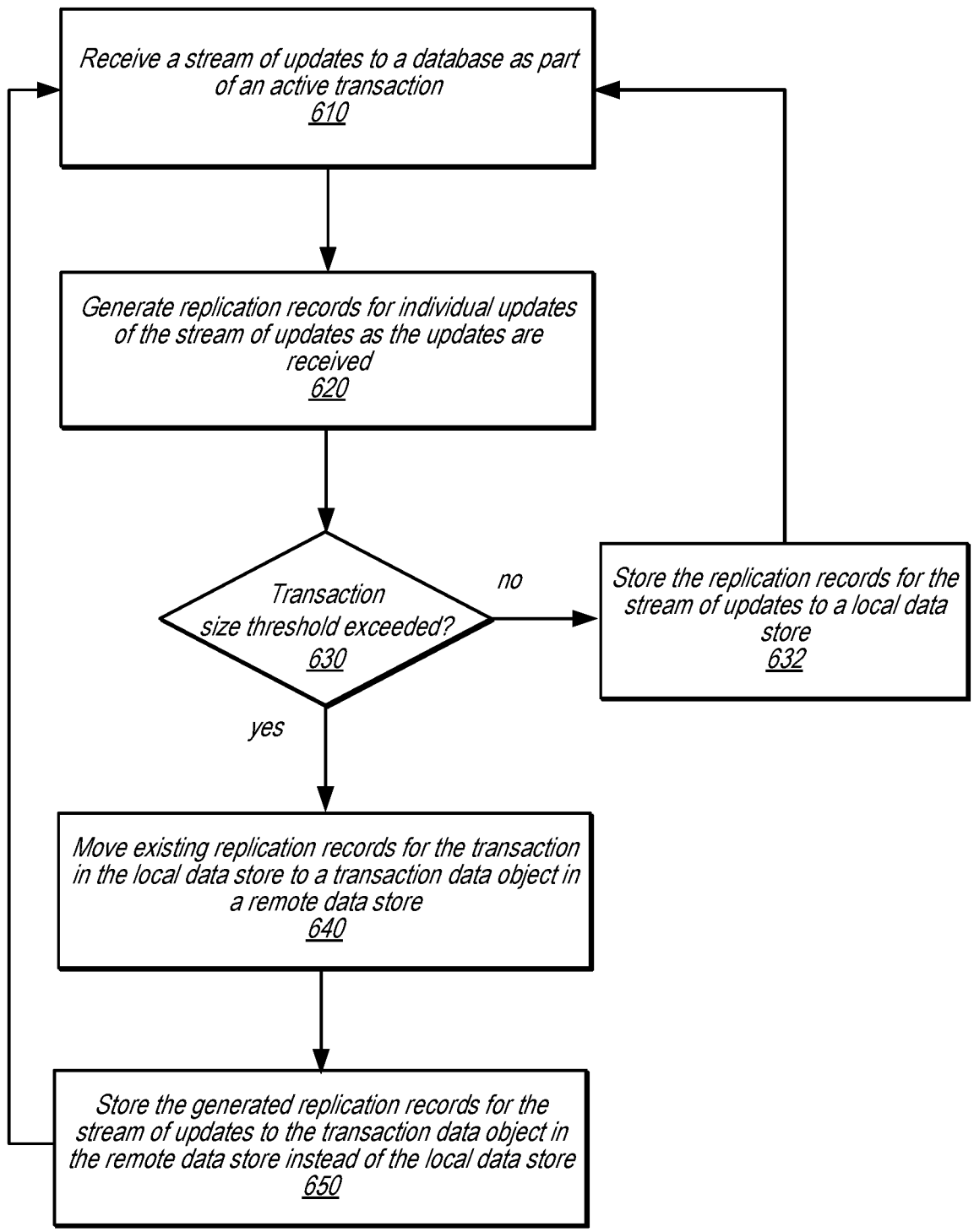
FIG. 6 is a high-level flow chart illustrating methods and techniques for amortizing replication log updates for transactions, according to some embodiments.

FIG. 5 is a logical block diagram illustrating a data flow for both amortizing and non-amortizing replication log records for transactions, according to some embodiments. Different transactions may be handled different, in various embodiments. For example, transaction A and transaction B may be handled with a non-amortized replication technique, as discussed below with regard to FIGS. 6 and 7. For example, transaction A non-amortized data stream 510 may have replication records stored in transaction A cache 512 until a cache size threshold is exceeded. Then, replication records may be spilled or otherwise stored to transaction A local object 514. Both transaction A cache 512 and transaction A local object 514 may be in local storage 560. Similarly, transaction B non-amortized data stream 520 may have replication records stored in transaction B cache 522 until a cache size threshold is exceeded. Then, replication records may be spilled or otherwise stored to transaction B local object 524. Both transaction B cache 522 and transaction B local object 524 may be in local storage 560. A request to commit these transactions as a group may be received, as indicated at 532 (e.g., by a query engine or by replication manager to update replication log 550 as a batch) the records may be ordered according to the transaction order of replication log 550 stored directly into replication log 550.

Other non-amortized transactions may be committed individually. For example, transaction C non-amortized data stream 540 may have replication records stored in transaction C cache 542 until a cache size threshold is exceeded. Then, replication records may be spilled or otherwise stored to transaction C local object 544. Both transaction C cache 542 and transaction C local object 544 may be in local storage 560. When a single or individual commit 536 is received, then the records from transaction C local data object 544 may be stored directly in replication 550 according to the transaction order for replication log 550.

For an amortized transaction, like transaction N, an amortized data stream 530 may be first stored into transaction N cache 532, when a transaction size threshold is exceeded, then the replication records may be spilled or otherwise stored into transaction N remote data object 534 in remote storage 570. Note that this happens before a request to commit is received. In some embodiments, a local object may be first used in local storage for transaction N if the replication records exceed a cache size threshold (not illustrated) before being spilled to remote data object 534. On commit 532, transaction N remote data object 534 may be inserted into replication log 550.

The database service and storage service discussed in FIGS. 2 through 5 provide examples of a system that may perform amortizing replication log updates for transactions. However, various other types of data stores (e.g., non-log structured) or other storage engines may implement amortizing replication log updates for transactions. FIG. 6 is a high-level flow chart illustrating methods and techniques for amortizing replication log updates for transactions, according to some embodiments. Various different systems and devices may implement the various methods and techniques described below, either singly or working together. For example, a database engine head node or storage node may implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 610, receive a stream of updates to a database as part of an active transaction, in some embodiments. The updates may be received individually or in groups. The updates may describe changes to data values of records or items in the database, or may describe changes to the schema, settings, format, or other database information. As indicated at 620, replication records for individual updates of the stream of updates may be generated as the updates are received. For example, logical replication records, such as those generated by MySQL's Binlog feature, may be generated that describe the changes to be performed to accomplish the updates, in some embodiments. In other embodiments, physical replication records may be generated that include the updated data values to be replicated.

As indicated 630, monitoring of the size of generated log records may be performed. A transaction size threshold may be applied, which may, in some embodiments, compare the number of updates, number of replication log records, amount of change to the database, storage size of replication log records, length of time for performing the active transaction, or any other measurement of transaction size. If the transaction size threshold is not exceeded, then as indicated at 632 the replication records of the stream of updates may be stored to a local data sore. As discussed above with regard to FIGS. 4 and 5, local data stores may include in-memory caches of replication log records or local transaction data objects in persistent storage devices.

As indicated at 640, when a size of generated replication log records exceeds the transaction size threshold, then existing replication records for the transaction in the local data store may be moved to a transaction data object in a remote data store. As indicated at 650, the newly generated replication records for the stream of updates may then be stored to a transaction data object in a remote data store (after the existing replication records are moved) instead of the local data store, in some embodiments. In some scenarios, a transaction data object may be used to store records until a size limit is reached (e.g., full), then a new transaction data object (which may be linked with or index to the prior transaction data object for the same transaction may be used).

Figure 7:
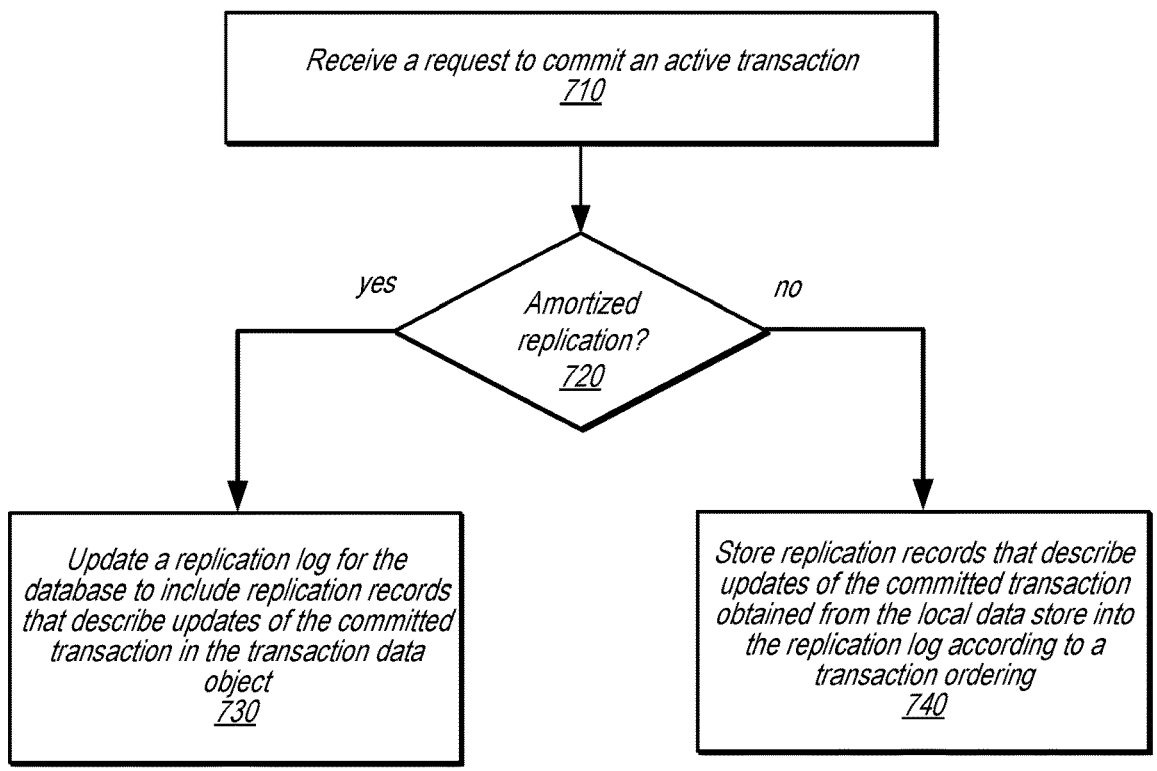
FIG. 7 is a high-level flow chart illustrating methods and techniques for updating a replication log, according to some embodiments.

FIG. 7 is a high-level flow chart illustrating methods and techniques for updating a replication log, according to some embodiments. As indicated at 710, a commit request may be received for an active transaction, in some embodiments. A determination may be made as to whether the transaction is using amortized replication for the replication log, as indicated at 720. For example, a storage map, or other metadata may indicate whether, replication log records are stored locally or remotely. In some embodiments, a transaction table may indicate the type of replication.

If amortized replication is used, then a replication log for the database may be updated to include replication records that describe updates of the committed transaction in the data object, in some embodiments, as indicated at 730. For example, the transaction data object may be formatted like a large record in the log (or series of log records such as an append-only file), and thus may be included by modifying pointers from previous log records in the replication log to point forward to the transaction data object and subsequent log records to point back to the object. In this way, the replication log can be updated without copying the records of the transaction data object or recalculating log structure features, such as record offsets (which may be zero as only a single transaction's records may be in the transaction data object) or checksums (which may have been deferred until the end of the transaction is received). The transaction data object may be sorted into the replication log according to a corresponding location for the commit order of the transaction relative to other committed transactions.

If a transaction is not amortized, then it may be committed with other transactions or individually, in some embodiments, as discussed above with regard to FIG. 5. For example, as indicated at 740, replication records that describe updates of the committed transaction may be obtained from the local data store and stored into the replication log according to a transaction ordering for the replication log. These change records may be written directly to the replication log.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 8:
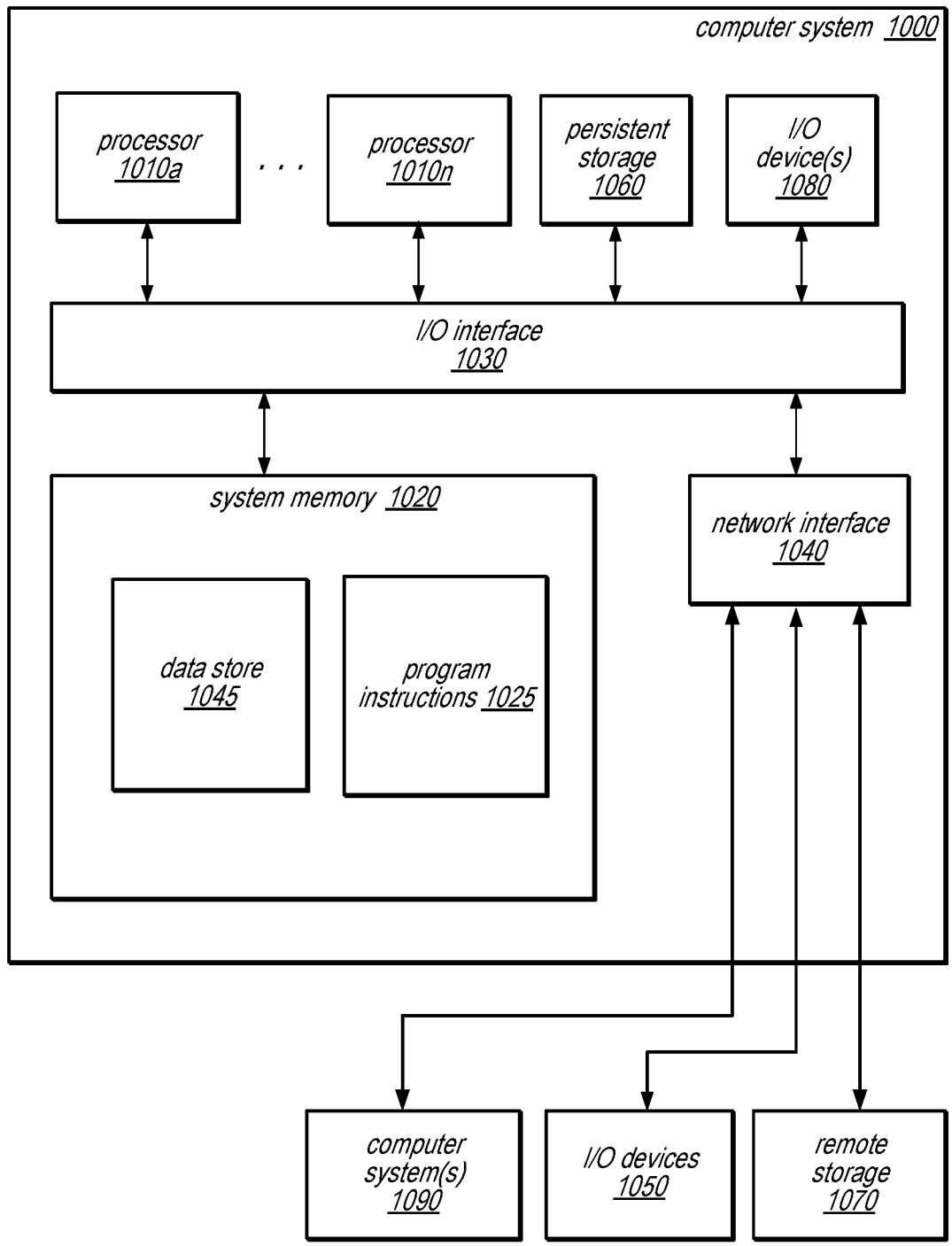
FIG. 8 is a block diagram illustrating a computer system that may implement at least a portion of systems described herein, according to some embodiments.

FIG. 8 is a block diagram illustrating a computer system that may implement at least a portion of the systems and techniques for amortizing replication log updates for transactions described herein, according to various embodiments. For example, computer system 1000 may implement a database engine head node of a database tier, or one of a plurality of storage nodes of a separate distributed storage system that stores databases and associated metadata on behalf of clients of the database tier, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 660, as desired, and may retrieve the stored instruction and/or data as needed. For example, in some embodiments, computer system 1000 may host a storage node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be implemented as described herein. For example, the information described herein as being stored by the database tier (e.g., on a database engine head node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, coalesced data pages, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:
1. A system, comprising:
at least one processor; and
a memory, storing program instructions that when executed by the at least one processor causing the at least one processor to implement a database;
wherein the database is configured to:
   receive a request to begin a transaction at the database;
   receive a stream of updates to the database as part of the transaction;
   generate respective replication records to be included to a replication log that describe individual updates of the stream of updates as the updates are received;
   prior to committing the transaction to the database:
      store a portion of the generated replication records that describe the stream of updates in a local cache of the database for the transaction in the memory; and
      responsive to a determination that a size of the stored portion of the generated replication records exceeds a transaction size threshold, store the generated replication records into a transaction data object in a remote data store instead of the local cache of the database, wherein the remote data store includes the replication log separately from the transaction data object;

receive a request to commit the transaction to the database; and update one or more pointers for one or more other log records or other transaction data objects in the replication log in the remote data store to point to the transaction data object to include the respective replication records of the transaction data object that were previously stored responsive to the determination that the size of the stored portion of the generated replication records exceeds the transaction size threshold without rewriting the respective replication records from the transaction data object into the replication log, wherein the replication records of the transaction data object describe the individual updates of the transaction that is committed to the database.

2. The system of claim 1, wherein the database is further configured to:

before the determination that the size of the stored portion of the generated replication records exceeds the transaction size threshold:

determine that the size of the stored portion of the generated replication records exceeds a cache size threshold for the transaction; and responsive to the determination that the size of the stored portion of the generated replication records exceeds the cache size threshold for the transaction, store the generated replication records in a local transaction data object in a local persistent storage device.

3. The system of claim 1, wherein the system further comprises one or more persistent storage devices, and wherein the database is further configured to:

receive a second stream of updates to the database for a second transaction;

generate replication records for the replication log that describe individual updates of the second stream of updates as the second stream of updates are received;

store at least a portion of the replication records for individual updates of the second stream of updates to a local transaction data object in the one or more persistent storage devices;

receive a request to commit the second transaction before determining that a size of the stored portion of the generated replication records for the second stream of updates exceeds the transaction size threshold; and update the replication log for the database to include the respective replication records that describe the individual updates of the committed second transaction from the local transaction data object.

4. The system of claim 1, wherein the at least one processor and the memory are implemented as part of a database service offered as part of a provider network, wherein the remote data store is implemented as part of a storage service offered as part of the provider network, wherein replication logging is enabled for the database responsive to a request received via an interface for the database service.

5. A method, comprising:

receiving a stream of updates to a database as part of an active transaction;

generating respective replication records for individual updates of the stream of updates as the updates are received;

prior to committing the active transaction to the database:

responsive to determining that a size of the generated replication records exceeds a transaction size threshold, storing the generated replication records for the stream of updates into a transaction data object in a remote data store instead of to a local data store, wherein the remote data store includes a replication log separately from the transaction data object;

receiving a request to commit the active transaction to the database; and updating one or more pointers for one or more other log records or other transaction data objects in the replication log in the remote data store to point to the transaction data object to include the respective replication records of the transaction data object that were previously stored responsive to the determination that the size of the stored portion of the generated replication records exceeds the transaction size threshold without rewriting the respective replication records from the transaction data object into the replication log, wherein the replication records of the transaction data object describe the individual updates of the active transaction that is committed to the database.

6. The method of claim 5, wherein the local data store is a local in-memory cache, and wherein the method further comprises:

before determining that the size of the generated replication records exceeds the transaction size threshold, storing the generated replication records in the local in-memory cache.

7. The method of claim 5, wherein the local data store is a local persistent storage device, and wherein the method further comprises:

before determining that the size of the generated replication records exceeds a transaction size threshold, storing the generated replication records in the local transaction data object in the local persistent storage device after the size of the generated replication records exceeds a cache size threshold for storing the generated replication records in a local in-memory cache.

8. The method of claim 5, further comprising:

receiving a second stream of updates to the database for a second active transaction;

generating replication records for individual updates of the second stream of updates as the second stream of updates are received;

receiving a request to commit the second active transaction before determining that a size of the generated replication records for the second stream of updates exceeds the transaction size threshold; and updating the replication log for the database to include the respective replication records that describe the individual updates of the committed second transaction from a local transaction data object storing the generated replication records for the second stream of updates.

9. The method of claim 8, wherein requests to commit one or more additional active transactions are received, and wherein updating the replication log for the database to include the respective replication records that describe the individual updates of the committed second transaction from the local transaction data object storing the generated replication records for the second stream of updates comprises:

inserting respective replication records for the one or more additional active transactions from respective local transaction data objects and the local transaction data object for the second active transaction into the replication log for the database according to a transaction ordering.

10. The method of claim 5, wherein the replication log orders transactions, including the active transaction, according to an order in which the transactions are committed, wherein the updating the replication log inserts the committed transactions into the replication log according to the order.

11. The method of claim 5, wherein updating the replication log for the database to include the respective replication records that describe the individual updates of the committed transaction in the transaction data object is performed without copying the respective replication records from the transaction data object.

12. The method of claim 5, wherein updating the replication log for the database to include the respective replication records that describe the individual updates of the committed transaction in the transaction data object is performed without duplicate calculation of offsets and checksums for the respective replication records.

13. The method of claim 5, wherein the replication records are logical descriptions of the updates to the database.

14. One or more non-transitory, computer-readable storage media, storing program instructions that when executed on or across one or more computing devices cause the one or more computing devices to implement:
  receiving a stream of updates to a database as part of an active transaction;
  generating respective replication records for individual updates of the stream of updates as the updates are received;
  prior to committing the active transaction to the database:
    storing the generated replication records for the stream of updates in a local data store until determining that a size of the generated replication records exceeds a transaction size threshold; and
    after determining that the size of the generated replication records exceeds the transaction size threshold, storing the generated replication records into a transaction data object in a remote data store, wherein the remote data store includes a replication log separately from the transaction data object;
  receiving a request to commit the active transaction to the database; and
  updating one or more pointers for one or more other log records or other transaction data objects in the replication log in the remote data store to point to the transaction data object to include the respective replication records of the transaction data object that were previously stored responsive to the determination that the size of the stored portion of the generated replication records exceeds the transaction size threshold without rewriting the respective replication records from the transaction data object into the replication log, wherein the replication records of the transaction data object describe the individual updates of the active transaction that is committed to the database.

15. The one or more non-transitory, computer-readable storage media of claim 14, wherein the local data store is a local persistent storage device, and wherein the one or more non-transitory, computer-readable storage media store further program instructions that when executed by the one or more computing devices cause the one or more computing devices to further implement:
  before determining that the size of the generated replication records exceeds a transaction size threshold, storing the generated replication records in the local transaction data object in the local persistent storage device after the size of the generated replication records exceeds a cache size threshold for storing the generated replication records in a local in-memory cache.

16. The one or more non-transitory, computer-readable storage media of claim 14, further comprising:
  receiving a second stream of updates to the database for a second active transaction;
  generating replication records for individual updates of the second stream of updates as the second stream of updates are received;
  receiving a request to commit the second active transaction before determining that a size of the generated replication records for the second stream of updates exceeds the transaction size threshold; and
  updating the replication log for the database to include the respective replication records that describe the individual updates of the committed second transaction from a local transaction data object storing the generated replication records for the second stream of updates.

17. The one or more non-transitory, computer-readable storage media of claim 16, wherein requests to commit one or more additional active transactions are received, and wherein, in updating the replication log for the database to include the respective replication records that describe the individual updates of the committed second transaction from a local transaction data object storing the generated replication records for the second stream of updates, the program instructions cause the one or more computing devices to implement:
  inserting respective replication records for the one or more additional active transactions from respective local transaction data objects and the local transaction data object for the second active transaction into the replication log for the database according to a transaction ordering.

18. The one or more non-transitory, computer-readable storage media of claim 14, wherein updating the replication log for the database to include the respective replication records that describe the individual updates of the committed transaction in the transaction data object is performed without copying the respective replication records from the transaction data object.

19. The one or more non-transitory, computer-readable storage media of claim 14, wherein the one or more non-transitory, computer-readable storage media store further program instructions that when executed by the one or more computing devices cause the one or more computing devices to further implement:
  before beginning the active transaction, receiving a request to enable replication logging in accordance with the transaction size threshold.

20. The one or more non-transitory, computer-readable storage media of claim 14, wherein the one or more computing devices are implemented as part of a database service that hosts the database in a provider network.

* * * * *